(12) United States Patent
Bergman et al.

(10) Patent No.: US 11,455,349 B2
(45) Date of Patent: *Sep. 27, 2022

(54) SECURITY INFORMATION MANAGEMENT FOR CONTENT DELIVERY

(71) Applicant: Fastly, Inc., San Francisco, CA (US)

(72) Inventors: Artur Bergman, San Francisco, CA (US); Tyler B. McMullen, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 605 days.

This patent is subject to a terminal disclaimer.

(21) Appl. No.: 16/120,660

(22) Filed: Sep. 4, 2018

(65) Prior Publication Data
US 2019/0073421 A1     Mar. 7, 2019

Related U.S. Application Data

(63) Continuation of application No. 14/485,322, filed on Sep. 12, 2014, now Pat. No. 10,068,014.

(60) Provisional application No. 61/936,440, filed on Feb. 6, 2014.

(51) Int. Cl.
| | | |
|---|---|---|
| *G06F 21/10* | (2013.01) | |
| *G06F 16/951* | (2019.01) | |
| *H04L 9/40* | (2022.01) | |
| *H04L 67/568* | (2022.01) | |

(52) U.S. Cl.
CPC ........... *G06F 16/951* (2019.01); *G06F 21/10* (2013.01); *H04L 63/0892* (2013.01); *H04L 67/568* (2022.05)

(58) Field of Classification Search
CPC ........ G06F 16/951; G06F 21/10; G06F 21/31; G06F 2221/2137; H04L 63/0892; H04L 67/2842
See application file for complete search history.

(56) References Cited

U.S. PATENT DOCUMENTS

| | | | |
|---|---|---|---|
| 7,752,450 B1* | 7/2010 | Palmer | G06F 21/31 713/183 |
| 7,882,538 B1* | 2/2011 | Palmer | G06F 21/31 713/150 |
| 8,713,646 B2* | 4/2014 | Stuntebeck | H04L 67/16 713/150 |
| 9,282,098 B1* | 3/2016 | Hitchcock | H04L 63/0884 |
| 9,930,122 B1* | 3/2018 | Kilday | H04L 67/141 |
| 9,986,273 B2* | 5/2018 | Xiong | H04N 21/254 |
| 2003/0014268 A1 | 1/2003 | Tobin et al. | |
| 2003/0093694 A1* | 5/2003 | Medvinsky | G06Q 20/367 726/6 |
| 2003/0177196 A1* | 9/2003 | Bhasin | H04L 67/2828 709/213 |

(Continued)

*Primary Examiner* — Jeffery L Williams
*Assistant Examiner* — Zhimei Zhu (57) ABSTRACT

Described herein are methods, systems, and software to handle verification information in a content node. In one example, a method of operating a content node includes receiving a secure content request from an end user device and determining the availability of verification information stored on the content node to service the secure content request. The method further provides, if the verification information is available, verifying the end user device based on the verification information. The method also includes, if the verification information is unavailable, querying an origin server to verify the end user device.

16 Claims, 5 Drawing Sheets

(56) References Cited

U.S. PATENT DOCUMENTS

| | | | |
|---|---|---|---|
| 2004/0073629 A1* | 4/2004 | Bazot | H04L 63/0281 709/217 |
| 2005/0015429 A1* | 1/2005 | Ashley | G06F 21/6263 709/200 |
| 2005/0172323 A1* | 8/2005 | Yang | G06F 9/465 725/109 |
| 2005/0273607 A1* | 12/2005 | Yamana | G06F 21/31 713/168 |
| 2006/0218227 A1 | 9/2006 | Spear | |
| 2006/0230265 A1* | 10/2006 | Krishna | H04L 63/0281 713/158 |
| 2006/0277596 A1* | 12/2006 | Calvert | H04L 63/0218 726/3 |
| 2007/0005779 A1* | 1/2007 | Yao | H04L 63/0807 709/228 |
| 2007/0089110 A1* | 4/2007 | Li | H04L 67/2847 717/178 |
| 2007/0157304 A1* | 7/2007 | Logan | G06F 16/957 726/12 |
| 2007/0180048 A1* | 8/2007 | Crick | G06F 21/335 709/217 |
| 2007/0198674 A1* | 8/2007 | Li | H04L 67/06 709/217 |
| 2007/0208946 A1* | 9/2007 | Baby | G06F 12/0875 713/182 |
| 2009/0113532 A1* | 4/2009 | Lapidous | G06F 21/10 726/7 |
| 2010/0122303 A1* | 5/2010 | Maloney | G06F 21/10 725/87 |
| 2013/0007228 A1 | 1/2013 | Sherman et al. | |
| 2013/0081110 A1 | 3/2013 | McGowan et al. | |
| 2013/0246563 A1* | 9/2013 | Cardozo | G06F 16/955 709/217 |
| 2013/0283033 A1 | 10/2013 | Ahuja et al. | |
| 2013/0346475 A1* | 12/2013 | Jasperson | H04L 67/02 709/203 |
| 2013/0346476 A1* | 12/2013 | Jasperson | H04L 67/142 709/203 |
| 2014/0026187 A1* | 1/2014 | Johnson | G06F 21/53 726/3 |
| 2014/0059649 A1* | 2/2014 | Hu | H04L 63/08 726/3 |
| 2014/0108672 A1* | 4/2014 | Ou | H04L 61/1511 709/238 |
| 2014/0109209 A1* | 4/2014 | Haynes | H04L 63/08 726/7 |
| 2014/0372515 A1* | 12/2014 | Chow | H04L 67/2842 709/203 |

* cited by examiner

SECURITY INFORMATION MANAGEMENT FOR CONTENT DELIVERY

RELATED APPLICATIONS

This application hereby claims the benefit of and priority to U.S. patent application Ser. No. 14/485,322, titled "SECURITY INFORMATION MANAGEMENT FOR CONTENT DELIVERY," filed Sep. 12, 2014, and U.S. Provisional Patent Application 61/936,440, titled "CONTENT DELIVERY SERVER SECURITY COOKIE MANAGEMENT," filed Feb. 6, 2014, each of which is hereby incorporated by reference in their entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery networks have been developed to create a layer of caching between the origin servers of the content providers and the end users. The content delivery networks typically have one or more content nodes distributed across a large geographic region to provide faster and lower latency access to the content for the end users. When end users request content, such as a web page, the content node is configured (typically through domain name systems or DNS) to respond to the end user requests instead of the origin servers. Domain name systems provide translations of domain names into Internet Protocol (IP) addresses allowing a content node to act as a proxy for the origin servers.

Content of the origin servers can be cached into the content nodes, and can be requested via the content nodes from the origin servers of the content originators when the content has not yet been cached. Content nodes usually cache only a portion of the original source content rather than caching all content or data associated with an original content source. Thus, content may consistently be replaced or purged based on end user requests and changes to the content itself.

In some examples, content that is cached on the content nodes may require verification before the content data is communicated to the end user devices. As such, each of the users that attempt to access the content may require separate cookies or other security information to gain access to the content. Accordingly, because the origin servers often manage the security information, difficulties may arise when implementing a content distribution network.

OVERVIEW

Examples disclosed herein provide methods, systems, and software for managing secure content requests for end user devices. In one example, a method of operating a content node includes receiving a secure content request from an end user device and determining the availability of verification information stored on the content node to service the secure content request. The method further provides, if the verification information is available, verifying the end user device based on the verification information. The method also includes, if the verification information is unavailable, querying an origin server to verify the end user device, receiving new verification information from the origin server to verify the end user device, and caching the new verification information for the end user device.

In another instance, a computer apparatus to operate a content node in a content delivery network includes, processing instructions that direct the content node to receive a secure content request from an end user device, and determine availability of verification information stored on the content node to service the secure content request. The processing instructions further direct the content node to, if the verification information is available, verify the end user device based on the verification information. The processing instructions also direct the content node to, if the verification information is unavailable, querying an origin server to verify the end user device. The computer apparatus also includes one or more non-transitory computer readable media that store the processing instructions.

In a further example, a content node for caching content in a content delivery network includes a communication interface configured to receive a secure content request from an end user device and provide the secure content request to a processing system. The processing system is configured to receive the secure content request and determine availability of verification information stored on the content node to service the secure content request. The processing system is also configured to, if the verification information is available, verify the end user device based on the verification information. The processing system is further configured to, if the verification information is unavailable, query an origin server to verify the end user device.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Network content, such as web page content, typically includes content such as text, hypertext markup language (HTML) pages, pictures, video, audio, code, scripts, or other content viewable by an end user in a browser or other application. This various network content can be stored and served by origin servers and equipment. The network content includes example website content referenced in FIG. 5, such as "www.gamma.gov," "www.alpha.com," and "www.beta.net," among others. In some examples, origin servers can serve the content to end user devices. However, when a content delivery network is employed, the content delivery network can act as a proxy to cache content delivery between origin servers and the end user devices.

Content delivery networks can add a layer of caching between origin servers of the content providers and the end users. The content delivery networks typically have one or more content nodes distributed across a large geographic region to provide faster and lower latency local access to the content for the end users. When end users request content, such as a web page, a locally proximate content node will respond to the content request instead of the associated origin server. Various techniques can be employed to ensure the content node responds to content requests instead of the origin servers, such as associating web content of the origin servers with network addresses of the content nodes instead of network addresses of the origin servers using domain name system (DNS) registration and lookup procedures.

In some examples, the content requests from the end user devices may include secure content requests. These secure content requests may require passcodes, or other cookies to verify the user device before returning the requested content. In some instances, the content node may include the required content, but due to storage space or other constraints, may not include the proper security information to verify the device. As a result, the content node may be required to request security verification from the origin server before it can provide the content to the user. However, once verified with the assistance of the origin server, verification information may be stored in the content node to provide faster verification on the next request from the user device.

Figure 1:
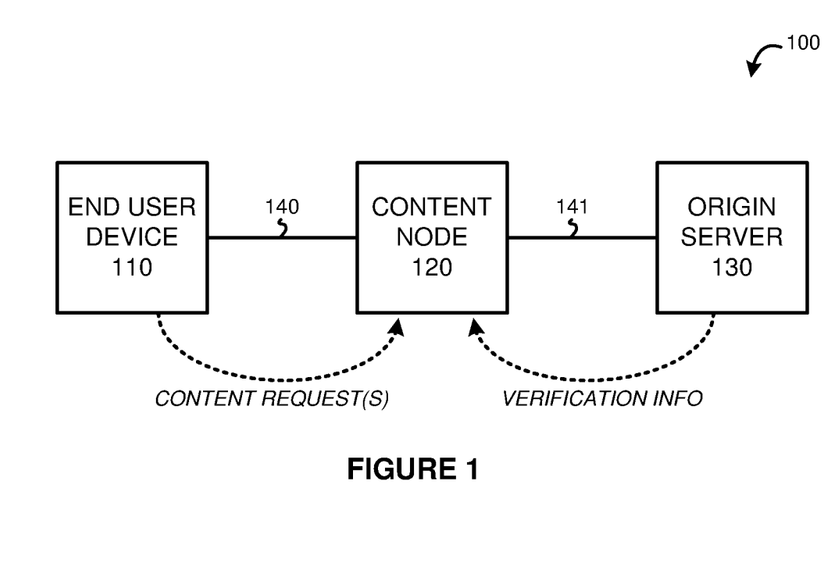
FIG. 1 is a system diagram illustrating the operation of a content delivery network.

To further illustrate the verification operations of the content node, FIG. 1 is included. FIG. 1 illustrates a communication system 100 for caching content to be delivered to end user devices. Communication system 100 includes end user device 110, content node (CN) 120, and origin server 130. End user device 110 communicates with CN 120 over communication link 140, and CN 120 further communicates with origin server 130 over communication link 141.

End user device 110 may comprise a phone, computer, media player, internet appliance, or some other similar content requesting device. CN 120 and origin server 130 may comprise one or more computing devices capable of storing or caching content to be provided to end user device 110 over communication links 140-141. Communication links 140-141 may use metal, glass, optical, air, space, or some other material as the transport media. Communication links 140-141 may use Time Division Multiplex (TDM), asynchronous transfer mode (ATM), IP, Ethernet, synchronous optical networking (SONET), hybrid fiber-coax (HFC), circuit-switched, communication signaling, wireless communication formats, or some other communication format, including improvements thereof. Communication link 140-141 may each be a direct link, or can include intermediate networks, systems, or devices, and can include a logical network link transported over multiple physical links.

In operation, CN 120 caches content from origin server 130 to be provided to end user device 110. Accordingly, when content is required by end user device 110 that would typically be provided by origin server 130, a DNS or some other mechanism may be modified to direct the requests to CN 120. Once the request is received, CN 120 identifies if the data is present in the node and that the user has permission to receive the data, and delivers the data if available. However, if the network content is not already stored in CN 120, CN 120 may responsively request the content from origin server 130 for delivery by the CN and possible caching by the CN.

In some examples, CN 120 may only cache the most recently requested or most popular requested content items. Accordingly, to make cache storage within CN 120 available for new content and data, older content and data must be purged. This purge may be initiated by an administrative system, the origin servers, the CN itself, or any other system control system communicatively coupled to the CN. Once removed, new content may be stored in the purged locations to be delivered to future requesting devices.

Although described above as storing content, CNs, such as CN 120, may also store cookies and other verification information related to the content to identify when a device has permission to access specific content. For example, an origin site may include a paywall that prevents Internet users from accessing webpage content without a paid subscription, or other security access requirements for different end users to access the content. Accordingly, for each of the users that attempt to access and view the content, a different cookie, passcode, or other similar security measure may be needed. Thus, although the content may be stored or cached in CN 120, the security information may not be available for the user to access the data and may require a communication with the origin server.

Figure 2:
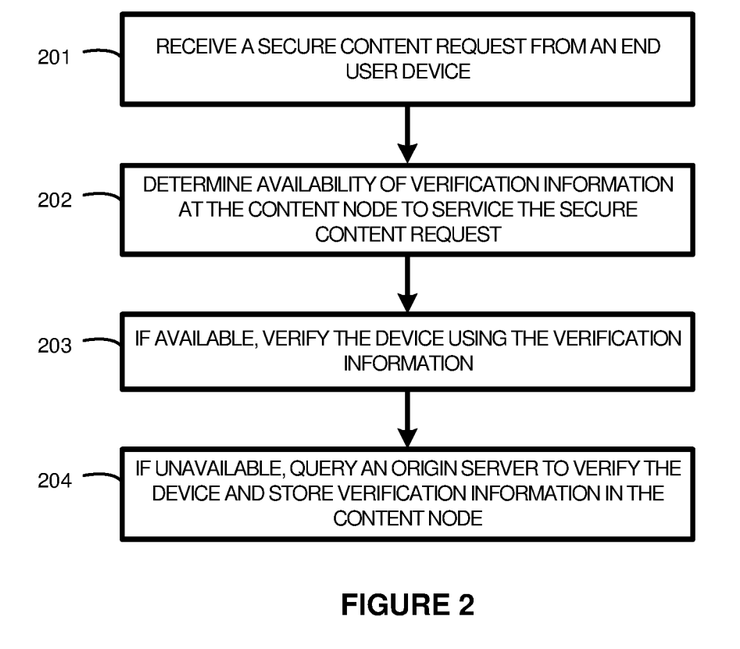
FIG. 2 is a flow diagram illustrating a method of operating a content node.

Turning to FIG. 2, FIG. 2 illustrates a method of operating a content node according to one example. The method includes receiving a secure content request from an end user device (201). As illustrated in FIG. 1, end user device 110 communicates with CN 120 to receive various cached content from origin server 130. In some examples, the communications with CN 120 may include secure content requests that require cookies or some other similar form of security information. Such security information may include usernames, passwords, IP addresses, or any other form of security information.

Once a secure content request is identified, the content node is configured to determine the availability of verification information to fulfill the request (202). This verification information allows the content node to compare the security information passed by the user device with expected verification information for the device. If the security information and the verification information match, then the device may be approved to receive the requested content. If, however, the information does not match, then the device will not be approved to receive the requested content.

Referring still to the method in FIG. 2, if the verification information is available on the content node, then this information may be used verify the device and transfer the requested content (203). For example, user device 110 may make a secure content request to CN 120. In response to the request, CN 120 may identify that it possess both the content and the verification information for the end user device. As a result, once the verification information is used to verify the device, the content may be transferred to end user device 110, without the use of the origin server.

In contrast, if the verification information is not included on the content node, the content node is required to query the origin server to verify the device and may store verification information for future communications (204). In some examples, the origin server may provide verification information to the content node, which allows the node to verify the device. Accordingly, if the device requires further secure content using the same security information, the device may be verified using the newly acquired information from the origin server. In other examples, the origin server may be used to verify the device. Once verified, the content node may store verification information passed from the origin server, or may store self-generated verification information for the device.

Although not illustrated for descriptive purposes, storage of the verification information may be treated the same as other data that is stored in the content node. Accordingly, the verification information may be purged over time as different data is cached in the node.

Figure 3:
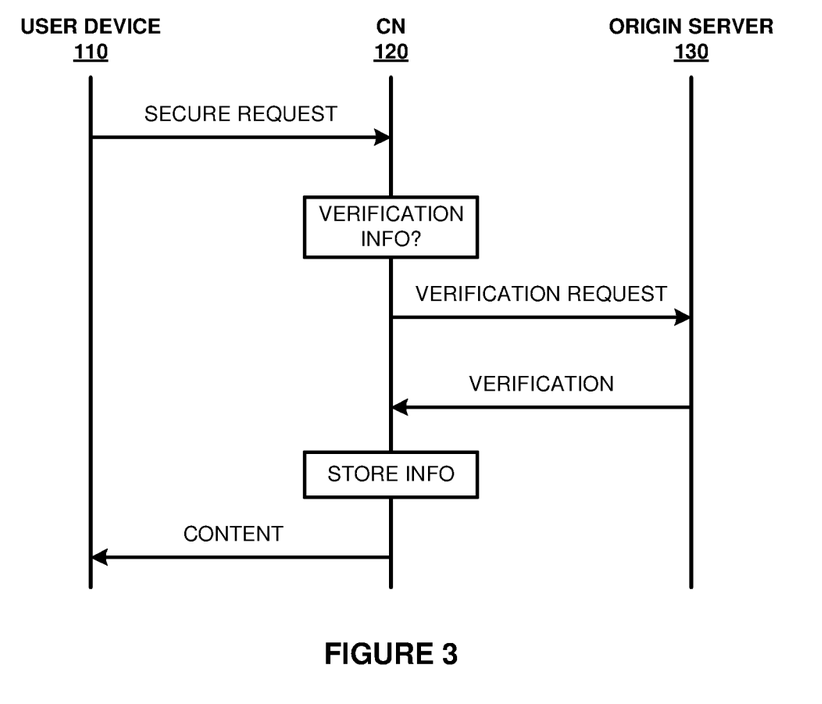
FIG. 3 is a timing diagram illustrating the operation of a content node.

Turning now to FIG. 3, FIG. 3 illustrates a timing diagram to further illustrate the operation of content node 120 in communication system 100. As illustrated in FIG. 3, user device 110 transfers a secure content request to CN 120. In response to the request, CN 120 determines the availability of verification information for the end user device. The content node uses the verification information to ensure that user device 110 is permitted to receive the requested content.

In the present example, the verification information necessary to validate the content request by user device 110 is unavailable on CN 120. Accordingly, CN 120 transfers a verification request to origin server 130 to assist in verifying the user device for the content. Responsive to the verification request, origin server 130 is configured to assist in verifying the user device to receive the requested content. In some examples, verification information from origin server 130 is transferred to the content node, and the content node uses this information to verify the device. In other instances, origin server 130 may initially verify the device, and further provide verification information to the content node to be used in verifying future content requests. Once verified, the device may then be provided with the requested content from CN 120.

In some examples, the verification information used by CN 120 may only be used or checked out for a certain period of time. Accordingly, rather than letting end user device 110 to continuously use the same verification information, the verification information may be periodically purged from CN 120 to ensure that the authorization of the device is still valid. For example, end user device 110 may require content that is accessible through a paywall that prevents Internet users from accessing webpage content without a paid subscription. When the end user device initiates a request, cookies or other similar security, information is transferred to CN 120 to be verified using cached verification information. To prevent the user from exploiting the content behind the paywall, the verification information cached in CN 120 may be purged to ensure that the origin server is periodically contacted to verify the end user device.

Figure 4A:
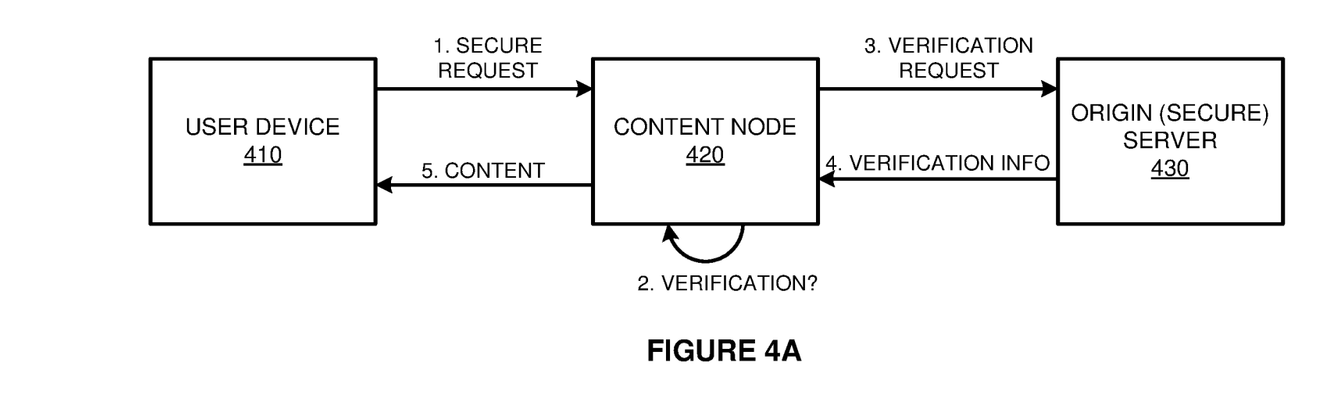
FIG. 4A is a system diagram illustrating the operation of a content node.
Figure 4B:
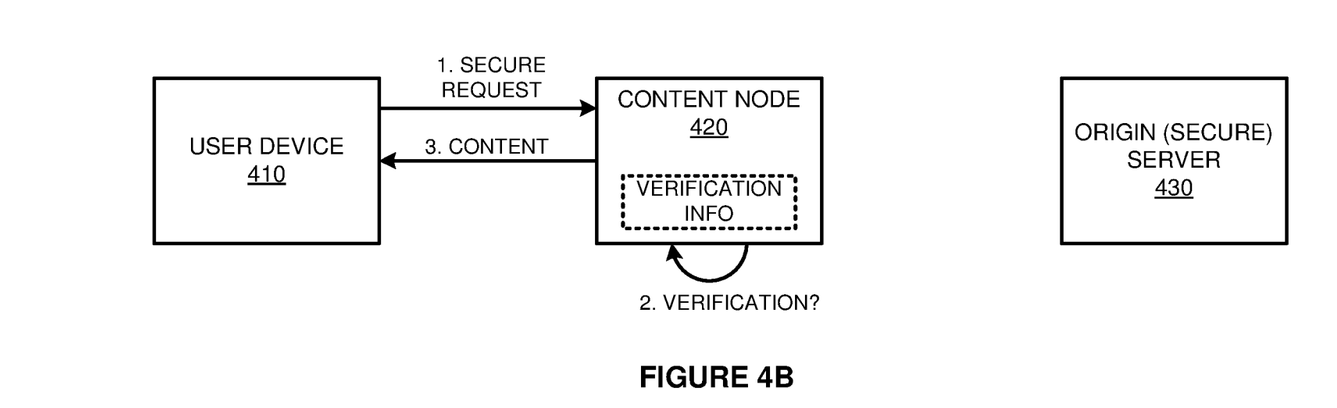
FIG. 4B is a system diagram illustrating the operation of a content node.

FIGS. 4A and 4B are block diagrams illustrating the operation of a content node to verify content requests from end user devices. FIGS. 4A and 4B include user device 410, content node 420, and origin or secure server 430.

As depicted in FIG. 4A, user device 410 may transfer a secure content request to content node 420. In response to the request, content node 420 determines if verification information is available to validate the device request. In some examples, the verification information is used to compare cookies or other security information passed by the user device to predefined expected values. Once it is determined that the verification information is not located on the content node, content node 420 is configured to pass a verification request to origin server 430. Origin server 430 may be the original server for the content, or may be a security server responsible for verifying devices to receive the content.

In response to the verification request, origin server 430 is configured to assist content node 420 in verifying user device 410 for the requested content. In some instances, to assist content node 420 in verifying the device, origin server 430 may first verify the device and transfer verification information to be stored on content node 420. In other examples, the verification information may be passed to content node 420 and the content node itself may verify the device.

Once the verification information is stored on content node 420, content node 420 may verify the device without contacting origin server 430. For example, referring to FIG. 4B, if user device 410 transfers a second secure content request to content node 420, content node 420 may use the predefined verification information to verify the device. Once verified by content node 420, the requested content may be provided to user device 410.

Although not illustrated in the present example, it should be understood that the verification information might be treated as any other content that is cached in the content node. As such, the verification information may be deleted or replaced over a period of time, requiring the content node to re-verify the user device with the origin server. Further, in some examples, the verification information may only be valid for a certain period of time to ensure that the content node periodically requests new verification information from the origin server. This requesting of verification information ensures that the origin server maintains control over the devices that receive content.

Figure 5:
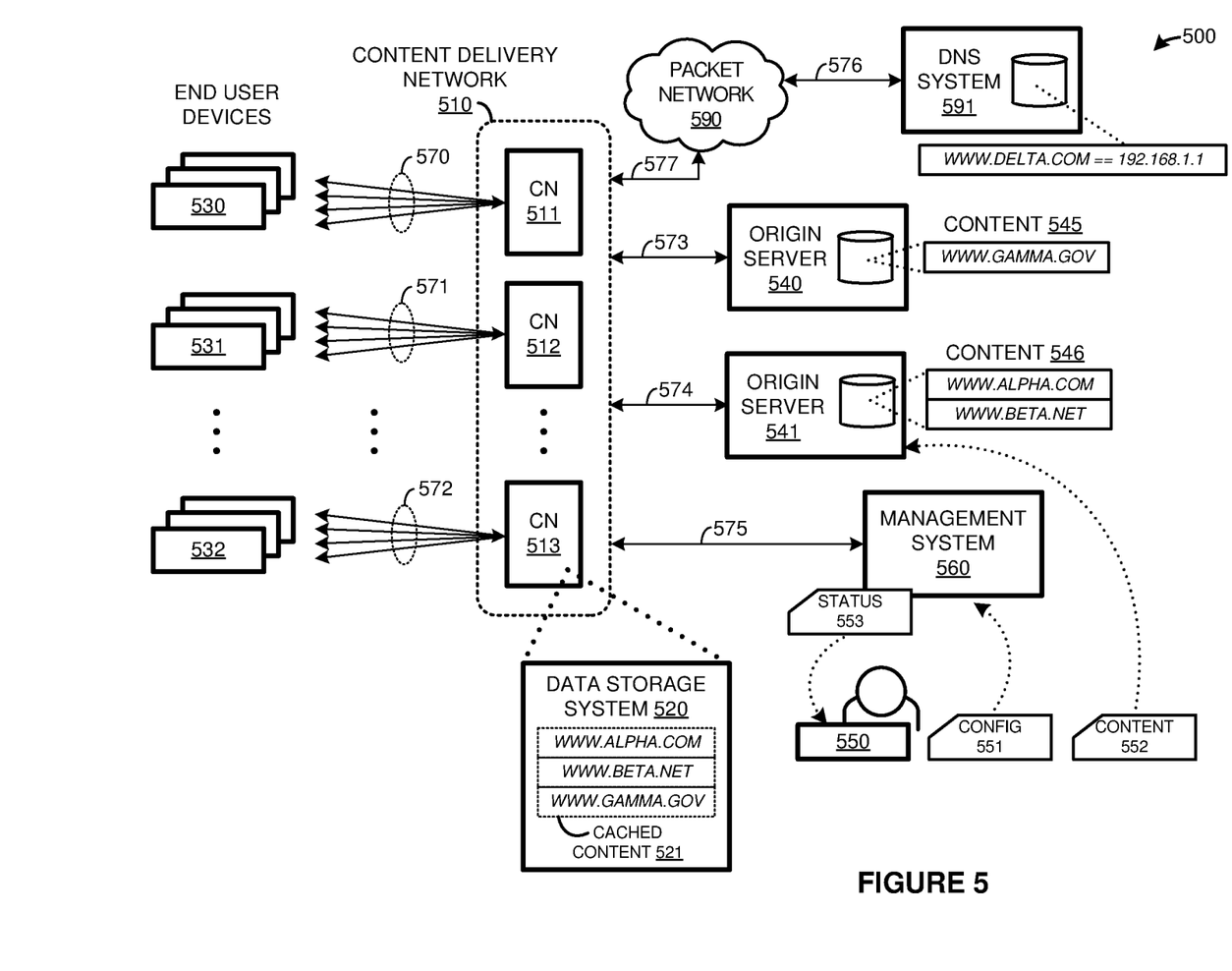
FIG. 5 is a system diagram illustrating the operation of a content delivery network.

To further illustrate the secure operations of the content node, FIG. 5 is included. FIG. 5 illustrates a content delivery communication system 500 according to one example. Communication system 500 includes content delivery network 510, end user devices 530-532, origin servers 540-541, management system 560, packet network 590, and DNS system 591. Content delivery network 510 includes one or more content nodes (CN) 511-513. Each of CN 511-513 can include one or more data storage systems, such as that illustrated for CN 513 as data storage system 520. End user devices 530-532 are representative of a plurality of end user communication devices that can request and receive network content. It should be understood that any number of end user devices 530-532 might be associated with each of content nodes 511-513. CN 511-513 and end user devices 530-532 communicate over associated network links 570-572. Content delivery network 510 and origin servers 540-541 communicate over associated network links 573-574. Content delivery network 510 and management system 560 communicate over link 575. User device 532 and DNS bypass system 595 communicate over link 576. Packet network 590 communicates with content delivery network 510 using communication link 577, and further communicates with DNS system 591 using communication link 576. Although not shown in FIG. 5 for clarity, each of CN 511-513 can also communicate with each other over network links.

To further illustrate FIG. 5, a brief description of the operation of communication system 500 is included. In operation, end user devices 530-532 request network content, such as content 545-546 associated with origin servers 540-541. Instead of these requests being handled by the individual origin servers 540-541, individual content nodes 511-513 of content delivery network 510 receive the content requests over one of links 570-572 and process the content requests for delivery of the content to the associated end user devices 530-532. Requested network content that is already stored in ones of CN 511-513 can be provided quickly to the end user devices, while network content that is not already stored in ones of CN 511-513 can be responsively requested by an associated one of CN 511-513 from an appropriate origin server 540-541 for delivery by the CN and possible caching by the CN. In this manner, each of CN 511-513 can act as intermediary proxy nodes to provide local and fast access for end user devices 530-532 to network content of origin servers 540-541 without burdening origin servers 540-541. FIG. 5 shows cached content 521 included in data storage system 520 of CN 513 as comprised of content 545-546, and thus content 545-546 is currently shown as cached by CN 513. Other configurations are possible, including subsets of content 545-546 being cached in individual ones of CN 511-513.

In some examples, the data requests from the various end user devices may include secure content requests that require cookies or other security elements. Cookies may comprise user names, passwords, or any other form of credentials to verify the user device. Once the content node receives the secure request, the node must then determine whether the appropriate verification information is present on the node. If the verification information is present, the content node may provide the content to the end user. However, if the information is not stored on the content node, the content node may require an origin server to verify the device. Once assisted by the origin server, the content node may store verification information to respond to future requests without first communicating with the origin server.

Although FIG. 5 shows content 545-546 of origin servers 540-541 being cached by data storage system 520, CN 511-513 can handle other content. For example, dynamic content generated by activities of end user devices 530-532 need not originally reside on origin servers 540-541, and can be generated due to scripting or code included in web page content delivered by CN 511-513. This dynamic content can also be cached by ones of CN 511-513, and can be specific to a particular end user device during a communication session.

Packet network 590 is used to connect DNS system 591 with content delivery network 510. Typically when end user devices 530-532 require content from a domain name, user devices 530-532 will contact a DNS system, such as DNS system 591, to translate alphanumeric domain names to numerical network address. As demonstrated in FIG. 5, if one of user devices 530-532 requires content from www.delta.com, DNS system 591 will return the appropriate network address for the domain name. From this numerical address, a content request can be made to the appropriate CN 511-513 or other server.

Referring still to FIG. 5, management system 560 handles configuration changes and status information collection and delivery for system operators and for the origin server operators or managers. For example, operator device 550 can transfer configuration 551 for delivery to management system 560, where configuration 551 can alter the handling of network content requests by CN 511-513, among other operations. Also, management system 560 can monitor status information for the operation of CN 511-513, such as operational statistics, and provide this status information as 553 to operator device 550. Furthermore, operator device 550 can transfer content 552 for delivery to origin servers 540-541 to include in content 545-546. Although one operator device 550 is shown in FIG. 5, it should be understood that this is merely representative and communication system 500 can include many operator devices for receiving status information, providing configuration information, or transferring content to origin servers.

Turning to the elements of FIG. 5, CN 511-513, origin servers 540-541, management system 560, packet network 590, and DNS system 591 can each include communication interfaces, network interfaces, processing systems, computer systems, microprocessors, storage systems, storage media, or some other processing devices or software systems, and can be distributed among multiple devices. Examples of CN 511-513, origin servers 540-541, management system 560, packet network 590, and DNS system 591 can each include software such as an operating system, logs, databases, utilities, drivers, caching software, networking software, and other software stored on a computer-readable medium. Content delivery network 510, in addition to including CN 511-513, can include equipment and links to route communications between CN 511-513 and any of end user devices 530-532, origin servers 540-541, management system 560, packet network 590, and DNS system 591, among other operations.

End user devices 530-532 can include subscriber equipment, customer equipment, access terminal, smartphone, personal digital assistant (PDA), computer, tablet computing device, e-book, Internet appliance, media player, game console, or some other user communication apparatus, including combinations thereof.

Communication links 570-577 each use metal, glass, optical, air, space, or some other material as the transport media. Communication links 570-577 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 570-577 can each be a direct link or can include intermediate networks, systems, or devices, and can include a logical network link transported over multiple physical links. Although one main link for each of links 570-577 is shown in FIG. 5, it should be understood that links 570-577 are merely illustrative to show communication modes or access pathways. In other examples, further links can be shown, with portions of the further links shared and used for different communication sessions or different content types, among other configurations. Communication links 570-577 can each include many different signals sharing the same associated link, as represented by the associated lines in FIG. 5, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 6:
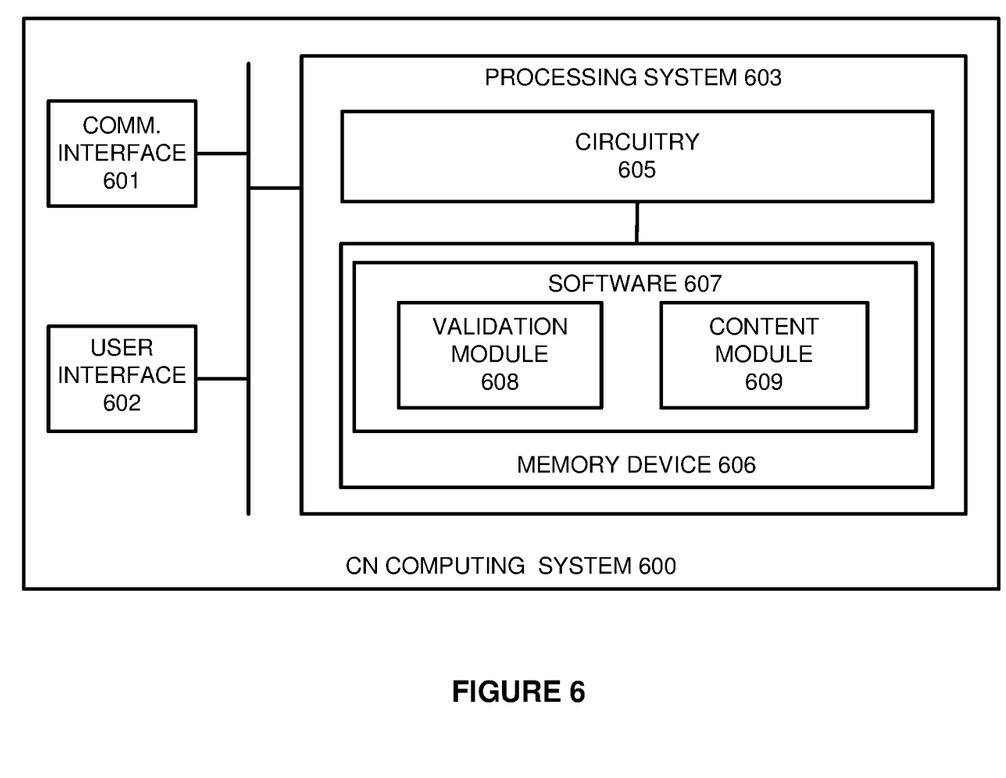
FIG. 6 is system diagram illustrating the operation of a content node computing system.

Turning to FIG. 6, FIG. 6 illustrates a content node (CN) computing system 600 for validating secure content requests from user devices. Computing system 600 is representative of a computing system that may be employed in any computing apparatus, system, or device, or collections thereof, to suitably implement content nodes described herein. CN computing system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. Communication interface 601 is configured to receive content requests from end user devices and transfer the content requests to processing system 603. Communication interface 601 is also configured to communicate with one or more origin servers that host content that can be cached in computing system 600 using content module 609.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes validation module 608 and content module 609. Operating software 607 may further include an operating system, utilities, drivers, network interfaces, applications, or some other type of software. When executed by circuitry 605, operating software 607 directs processing system 603 to operate CN computing system 600 as described herein.

In particular, validation module 608 on computing system 600 is configured to manage the validation of secure content requests from various end user devices. To accomplish this task, computing system 600 is configured to receive secure content requests at communication interface 601. Once received, the requests are transferred to validation module 608 that is configured to determine if the proper validation information is present to authorize the device for the content.

If the validation information is not present or available, CN computing system 600 may transfer a validation request to an origin or security server to validate the device. In turn, the origin server will assist in validating the device allowing the requested content cached on computing system 600 to be transferred to the user device. Additionally, once the device has been validated, computing system 600 is configured to store new validation information for the user device. This new validation information, transferred by the origin server, allows the device to be validated without forwarding future requests to the origin server. Thus, if the user device transfers a second secure content request, computing system 600 can check the new validation information and provide the content to the user device.

In some examples, the validation information that is stored in connection with validation module 608 may only be used for a certain period of time. This allows the origin server to maintain control over the end user devices that have access to the cached content. For example, an origin server may prefer that validation information, such as cookies, only be provided for a ten-minute period. Accordingly, once the ten minutes have elapsed, the origin server, or some other system, may initiate a purge of the verification information, ensuring that the next secure content request uses the origin server to authorize the content delivery.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a cache server in a content delivery network to support content paywalls, the method comprising:
   receiving a content request from an end point for content hosted by an origin server behind a paywall and stored by the cache server;
   determining a state of a cookie associated with the content request based at least on verification information stored on the cache server and associated with the end point and at least one previous request for different content; and
   in response to determining that the state of the cookie is valid, serving the content to the end point from the cache server.

2. The method of claim 1, wherein determining the state of the cookie occurs in the cache server.

3. The method of claim 1, further comprising purging the verification information from the cache server.

4. The method of claim 1, further comprising purging the verification information from the cache server in response to an expiration of a timer.

5. The method of claim 1, wherein:
   the origin server comprises a website;
   the content of the content request comprises media hosted by the website; and
   the different content comprises different media hosted by the website.

6. The method of claim 1, further comprising, after passing the previous verification request to the origin server, receiving the verification information from the origin server and storing the verification information on the cache server.

7. A method of operating a cache server in a content delivery network to support content restrictions, the method comprising:
   receiving a content request from an end point for content hosted by an origin server and stored by the cache server, wherein the content request includes security information;
   determining if verification information associated with the security information is stored on the cache server from a previous request for different content; and
   in response to determining that the verification information is not stored on the cache server, sending a verification request to the origin server.

8. The method of claim 7, further comprising, after sending the verification request to the origin server, receiving and storing verification information associated with updated security information on the cache server.

9. The method of claim 8, further comprising sending the updated security information to the end point for use with one or more subsequent requests.

10. The method of claim 9, further comprising purging the verification information from the cache server.

11. The method of claim 7, wherein: the security information is a cookie; and the origin server comprises a website.

12. A system comprising:
- a means for receiving a content request from an end point for restricted content hosted by an origin server and stored by a cache server;
- a means for determining a state of security information associated with the content request based at least on verification information stored on the cache server and associated with the end point and one or more previous requests for different content; and
- a means for serving the content to the end point from the cache server in response to determining that the state of the security information is valid.

13. The system of claim 12, wherein the means for determining the state of the security information is in the cache server.

14. The system of claim 13, further comprising a means for purging the verification information from the cache server.

15. The system of claim 12, further comprising a means for purging the verification information from the cache server in response to an expiration of a timer.

16. The system of claim 12, wherein:
- the origin server comprises a website;
- the content comprises a content item hosted by the website; and
- the different content comprises different content item hosted by the website.

* * * * *